United States Patent [19]

O'Hanlon

[11] 4,210,201

[45] Jul. 1, 1980

[54] LOW COST HEAT STORAGE TANK AND HEAT EXCHANGER

[76] Inventor: Edward J. O'Hanlon, Assembly Point, Lake George, N.Y. 12845

[21] Appl. No.: 882,049

[22] Filed: Feb. 28, 1978

[51] Int. Cl.² ............................................. F28D 21/00
[52] U.S. Cl. .................................. 165/104 S; 165/45; 126/436
[58] Field of Search .............. 165/45, 104 S, DIG. 4; 62/260; 126/436

[56] References Cited

U.S. PATENT DOCUMENTS

| | | | |
|---|---|---|---|
| 1,823,661 | 9/1931 | O'Brien | 165/45 X |
| 1,974,244 | 9/1934 | Lapp | 165/45 X |
| 2,119,038 | 5/1938 | Bell | 165/45 X |
| 2,217,190 | 10/1940 | Urguhart | 165/45 |
| 2,374,609 | 4/1945 | McCollum | 165/179 X |

FOREIGN PATENT DOCUMENTS 492126  9/1938  United Kingdom ...................... 165/45

*Primary Examiner*—Albert W. Davis
*Attorney, Agent, or Firm*—Pollock, Vande Sande & Priddy

[57] ABSTRACT

Damp sand receiving heat through spiraled sheet copper or aluminum tubes conveying heated air or other gas inside a heavily insulated tank is the subject of this present inventive disclosure.

8 Claims, 2 Drawing Figures

LOW COST HEAT STORAGE TANK AND HEAT EXCHANGER

Heat collectors using air or gas as a working fluid are of lower cost than heat collectors using liquids or water as their working fluid.

One of the items delaying the general acceptance of solar heating in all forms of shelter structures is the high cost and complexity and the absence of means or method of storing said heat after it has been collected.

To the low cost solution of these same problems this present invention is directed. It includes a waterproof tank within a heavily heat insulated space, said tank containing dampened sand as a means and method of holding delivered heat received from copper or aluminum sheet tubes within the sand, said tubes functioning to bring the heat into the tank, deposit it in the sand, distributing it through the sand, and remove it from the sand when said heat is properly required elsewhere. Be it noted that said sheet metal tubes are with spiraled walls that as the heated gas or gases pass through the tubes then functioning as low cost heat exchangers, cause the gas or gases to whirl, thus keeping said gas or gases close to the walls of the tubes and increasing their heat exchange effectiveness.

Figure 1:
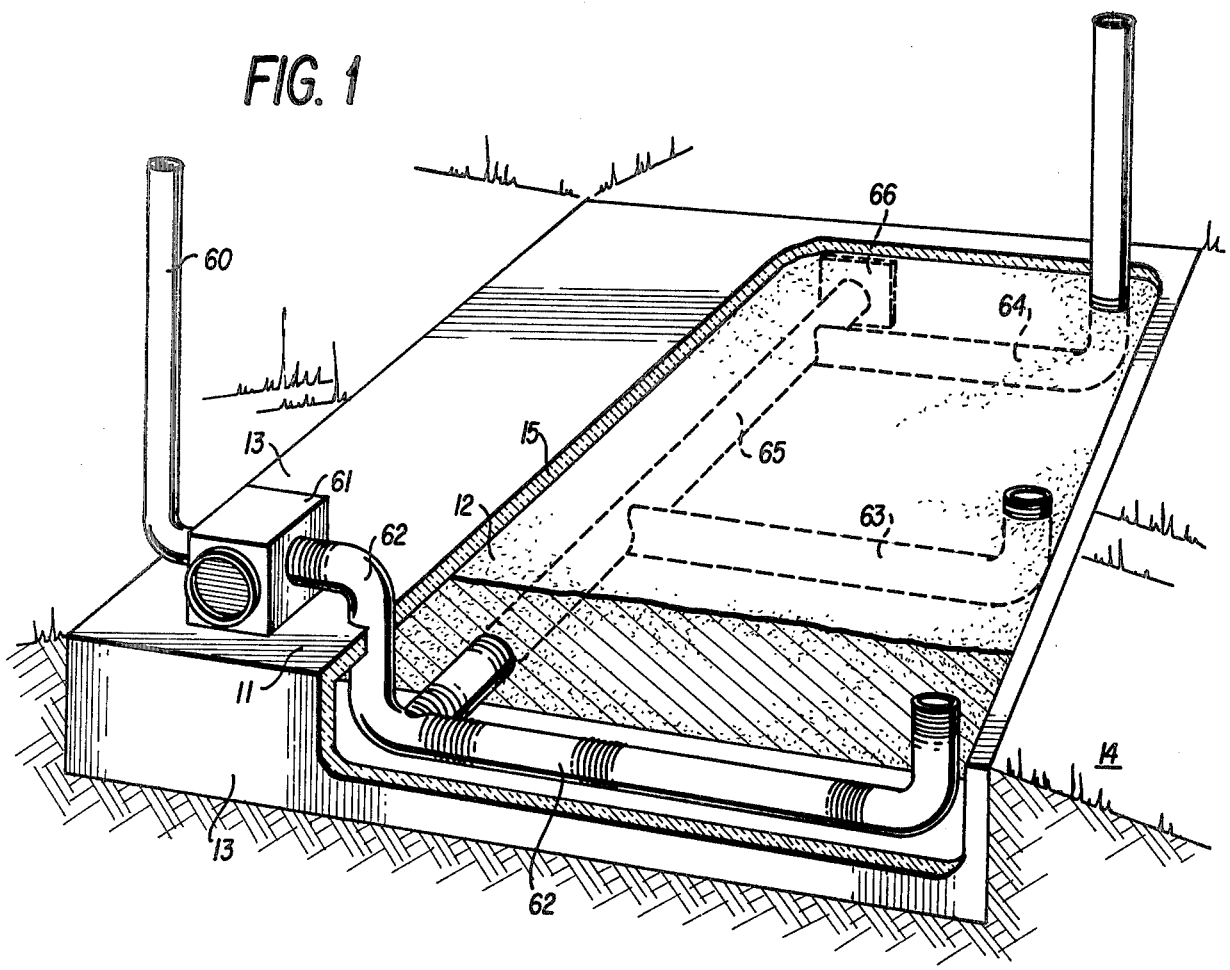
FIG. 1 shows a water proofed heavily insulated tank containing sand and a series of heat exchanger tubes buried in the sand.
Figure 2:
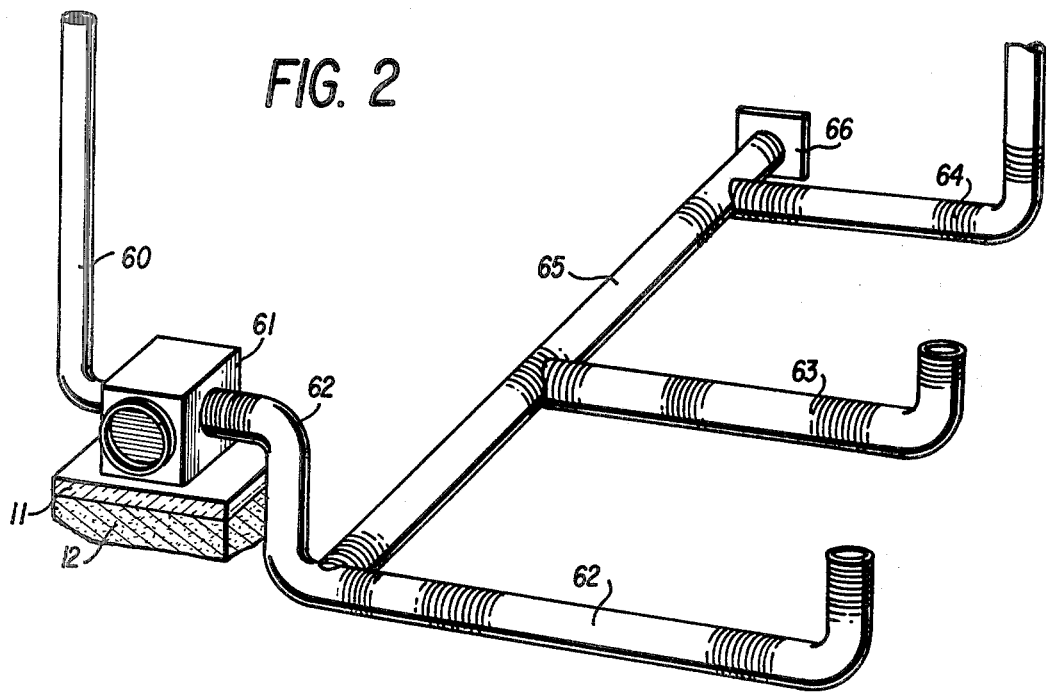
FIG. 2 shows the horizontal arrangement of the heat exchanger tubes.

The bank of sand known to me as a Solar Bank was primarily perfected for storing solar heat, but later has since proven itself to be ideal for storing heat generally over substantial periods of time.

Initially pebbles were thought to be the ideal means for storing heat. But I have found that because sand (ocean beach sand) offers far greater surface for the reception of heat that, when such sand is moist it makes the best receiver and retainer of heat over any other means or method of taking heat in (to itself) and giving it out again that has yet been devised.

The sheet metal tube with walls that are spiraled develop a series of cracks that allow condensation to be released into the sand. This seems to improve the heat storage ability of the sand and when the heat stored comes up into a building or into a house, the air is forced to be humidified thus making it more acceptable to human beings.

In the drawings pipe 60 and fan 61 issue heat in air under slight pressure to enter tube 62. The heat in 62 goes down through floor boards 11 into the sand 12 and fan out through other attached tubes 63, 64, and 65. At the end of tube 65 is a sheet welded over the end given numeral 66.

This air piping system puts heat in or takes heat out in a very simple and direct fashion.

I claim:

1. An assembly for storing a quantity of heat in a heat storage means and later retrieving a substantial portion of said heat as required, and comprising:

a waterproofed tank-like enclosure formed of heavily insulated material and including at least one inlet and one outlet aperture, each extending through said enclosure;

pipe means extending through said enclosure between said inlet and outlet apertures for providing an air flow passageway through said enclosure and having means for allowing condensation to pass between the airstream within the pipe and said heat storage means;

blower means in fluid communication with said inlet for introducing a stream of air into said pipe means; and, heat storage means comprising a mixture of solids and water surrounding said pipe means for receiving heat from the air flowing through said pipe means, for storing said heat within said enclosure over an extended period of time and for returning a substantial portion of said heat to the stream of air flowing through said pipe means.

2. An assembly according to claim 1 wherein said pipe means comprises at least one tubular member constructed of a sheetmetal-like material, and said means comprises said tubular member having a spiraled wall formed with a series of cracks to allow condensation to pass between the stream of air and said heat storage means.

3. An assembly according to claim 1, wherein said enclosure includes a plurality of spaced outlet apertures extending therethrough.

4. An assembly according to claim 3, wherein said pipe means comprises a main tubular member positioned within said enclosure and including a first end portion in fluid communication with said inlet aperture and further including an opposite end portion sealed against the flow of air therethrough, said pipe means further comprises a plurality of separate tubular members, with each of the separate tubular members having a first end portion in fluid communication with an intermediate portion of said main tubular member and each of the separate tubular members further having an opposite end portion in fluid communication with one of said plurality of spaced outlet apertures.

5. An assembly according to claim 4, wherein said main tubular member and each of said separate tubular members is constructed of a sheetmetal-like material, and each of the tubular members includes a spiraled wall formed with a series of cracks to allow condensation to pass between the stream of air and said heat storage means.

6. An assembly according to claim 1, wherein said heat storage means comprises a mixture of sand and water positioned within said waterproofed and heavily insulated material.

7. An assembly according to claim 1 wherein said pipe means comprises a plurality of tubular members constructed of a copper sheet-like material.

8. An assembly according to claim 1, wherein said pipe means comprises a plurality of tubular members constructed of an aluminum sheet-like material.

* * * * *